July 6, 1965
P. DUGAS ETAL
3,193,276
PRECISION VISE
Filed Oct. 18, 1963
3 Sheets-Sheet 1
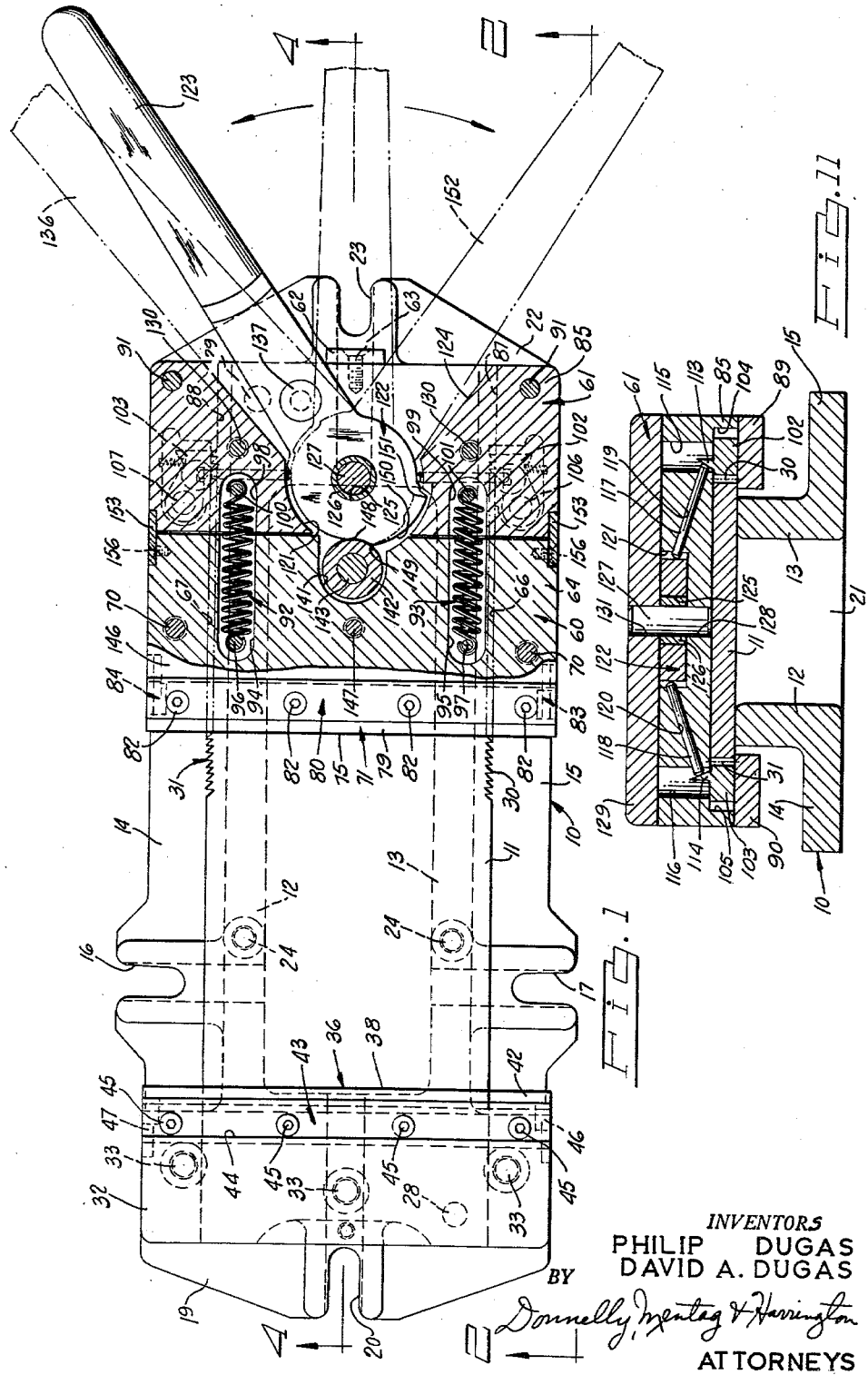
INVENTORS
PHILIP DUGAS
DAVID A. DUGAS
BY
Donnelly, Mentag & Harrington
ATTORNEYS

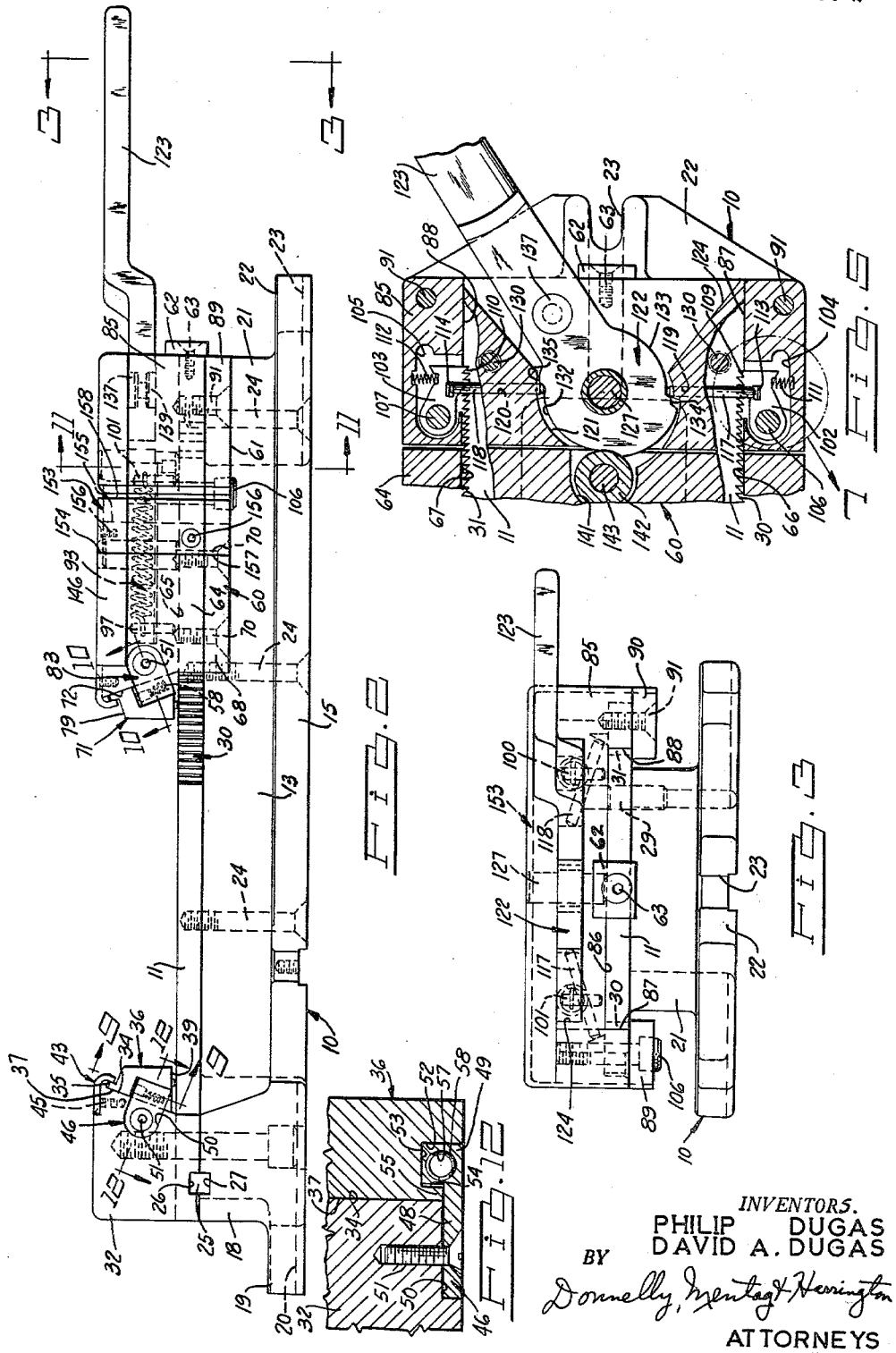

July 6, 1965
P. DUGAS ETAL
3,193,276
PRECISION VISE
Filed Oct. 18, 1963
3 Sheets-Sheet 3
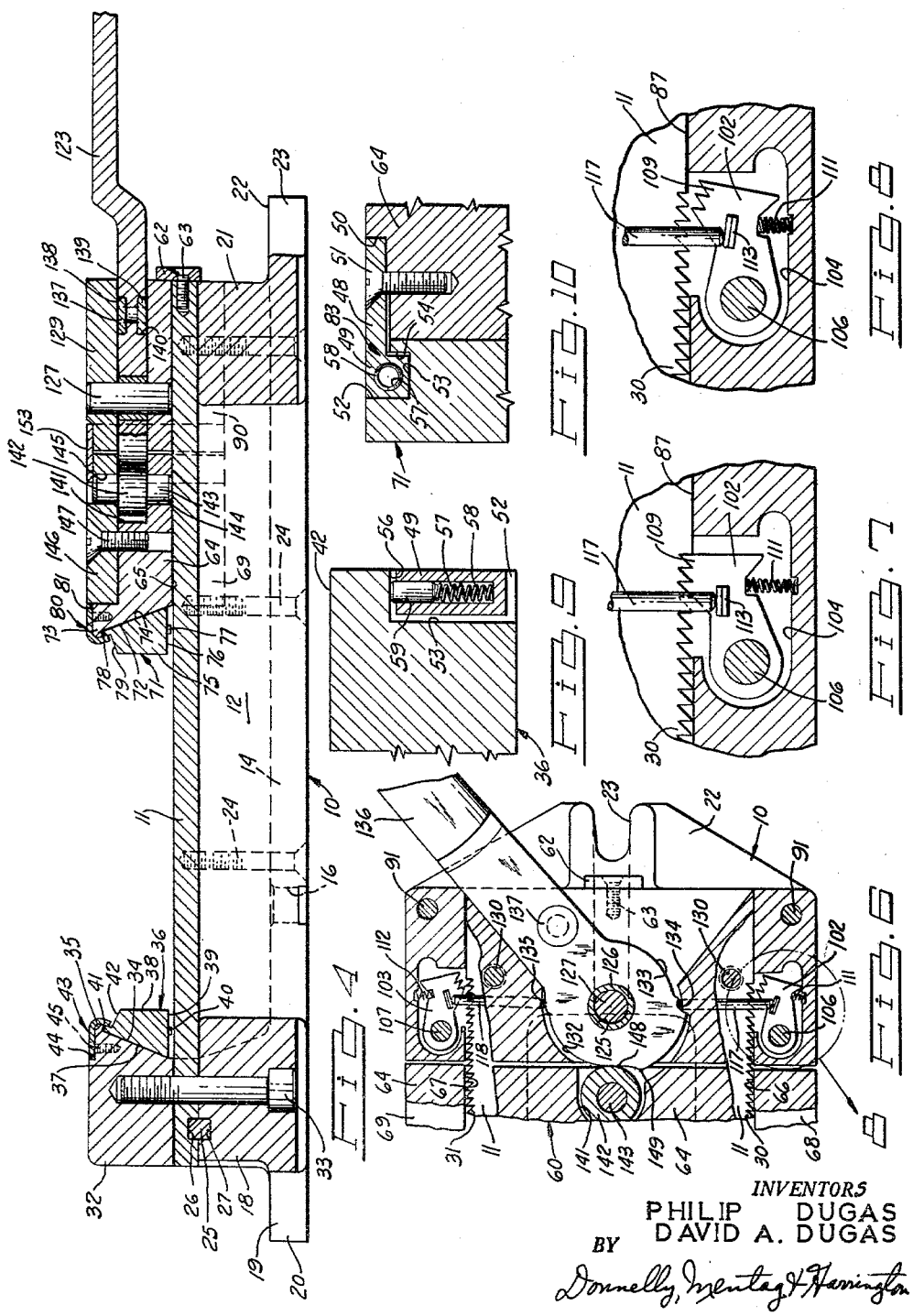
INVENTORS
PHILIP DUGAS
DAVID A. DUGAS
BY
Donnelly, Mentag & Harrington
ATTORNEYS United States Patent Office 3,193,276
Patented July 6, 1965

3,193,276
PRECISION VISE
Philip Dugas, Mount Clemens, and David A. Dugas, St. Clair Shores, Mich., assignors, by direct and mesne assignments, of one-half to Atom Tool and Die Corporation, a corporation of Michigan, and one-half to Crew's Die Casting Corporation, a corporation of Michigan
Filed Oct. 18, 1963, Ser. No. 317,219
20 Claims. (Cl. 269—136)

This invention relates generally to vises, and more particularly, to a quick-acting, mechanically operated precision vise for automatically leveling a workpiece into position for machining operations thereon.

It is important in machining operations to provide a vise for holding workpieces in a proper position and wherein succeeding workpieces can be brought into said proper position without having to use any indicating device. Heretofore, vises have been provided with pivoted type jaws in an attempt to provide a vise wherein succeeding workpieces could be brought into the same exact position as the prior workpiece. However, experience has shown that pivoted type vise jaws are subject to sticking so as to hold workpieces in a position spaced upwardly from the vise base plate upon which the workpiece is supposed to be seated. Accordingly, it is an important object of the present invention to provide a quick-acting precision vise which is provided with a pair of jaws adapted to grip a workpiece therebetween and be cammed downwardly on a tapered guiding surface so as to automatically level the workpiece into position on the upper surface of the hardened base of the vise, and wherein the vise is constructed and arranged so that succeeding workpieces can be brought into the same exact position as a prior workpiece for machining operations thereon without the need for any device for indicating the position of the succeeding workpieces.

It is another object of the present invention to provide a novel and improved precision vise for clamping a workpiece in a fixed position, including, a stationary base plate having a front jaw mounted thereon, a rear slide movably mounted on said base plate and provided with releasable locking means for locking the rear slide to the base plate, a front slide on the base plate having a rear jaw mounted on the front end thereof for cooperating with said front jaw to hold the workpiece in level position on the base plate, spring means for normally holding the front slide in abutting relation with the front end of the rear slide, and cam means mounted on bearings in the rear slide and movable between two positions by means of a handle integrally connected to said cam means, whereby when the handle is moved to a first position, the cam means will be operated to release said locking means to provide quick movement of the front and rear slides along the base plate, and when said handle is moved to a second position, said cam means will engage a roller mounted on said front slide and move the front slide apart from said rear slide so as to grip a workpiece between said jaws.

It is another object of the present invention to provide a novel and improved precision machine vise which includes a fixed front jaw, and a movable rear jaw mounted on a quick-acting slide means which includes a rear silde adapted to be releasably locked with pawl teeth spaced at predetermined distances from the fixed jaw, along the longitudinal side edges of the vise base plate. The front slide is connected to the rear slide by spring means which automatically returns the front slide to the starting position against the front face of the rear slide, whereby succeeding workpieces can be inserted between the fixed and movable jaws without resetting the rear slide. The slide means may be quickly moved to hold workpieces ranging in size from zero to six inches in length, and even larger lengths depending on the size of the vise, because of the fact that the pawl teeth are all spaced at known distances from the fixed jaw and the slide means can thus be moved from zero position to the full capacity of the vise in a minimum of time and be set to any given position without the use of any set-up tools.

It is still another object of the present invention to provide a novel and improved precision vise which is simple and compact in construction, economical of manufacture and efficient in operation.

It is still another object of the present invention to provide a novel and improved precision vise having a pair of jaws mounted for downward movement on tapered surfaces and maintained in upwardly disposed positions above the vise base plate when in an inoperative position, and adapted to grip a workpiece therebetween and be cammed downwardly on the tapered surfaces to bring the workpiece into flush position on the vise base plate.

It is still another object of the present invention to provide a novel and improved precision vise which is provided with a pair of jaws for holding a workpiece therebetween and wherein one of said jaws is carried on one of a pair of slides mounted on the base plate of the vise, and said vise includes a rotatable cam means mounted on bearing means and operably by a single handle for camming said one side away from the other slide to grip a workpiece between said jaws when said handle is moved in one direction, and when the handle is moved in the direction the first slide is returned by a spring means back against the second slide to release the workpiece and unlock the slides from the vise base plate for quick movement along the same to a new position.

Other objects, features and advantages of this invention will be apparent from the following detailed description, appended claims, and the accompanying drawings.

In the drawings:

FIG. 1 is a top plan view with parts broken away and with parts in section of a precision vise made in accordance with the principles of the present invention;

FIG. 2 is a side elevational view of the structure illustrated in FIG. 1, taken along the line 2—2 thereof, and looking in the direction of the arrows;

FIG. 3 is a right end elevational view of the structure illustrated in FIG. 2, taken along the line 3—3 thereof, and looking in the direction of the arrows;

FIG. 4 is a longitudinal sectional view of the structure illustrated in FIG. 1, taken along the line 4—4 thereof, and looking in the direction of the arrows;

FIG. 5 is a fragmentary, plan view of the right end of the structure illustrated in FIG. 1, with additional parts broken away and parts in section, and showing the slide locking pawls in locking engagement with the rear slide;

FIG. 6 is a view identical to FIG. 5, and showing the handle moved to a position to move the pawls to an inoperative position;

FIG. 7 is a fragmentary, enlarged view of the structure illustrated in FIG. 5, taken within the circle marked "7," and showing a slide locking pawl in locking position;

FIG. 8 is a fragmentary, enlarged view of the structure illustrated in FIG. 6, taken within the circle marked "8," and showing a slide locking pawl in an inoperative position;

FIG. 9 is a fragmentary, enlarged, elevational sectional view of the structure illustrated in FIG. 2, taken along the line 9—9 thereof, and looking in the direction of the arrows;

FIG. 10 is a fragmentary, enlarged, elevational sectional view of the structure illustrated in FIG. 2, taken along the line 10—10 thereof, and looking in the direction of the arrows;

FIG. 11 is an elevational sectional view of the structure illustrated in FIG. 2, taken along the line 11—11 thereof, and looking in the direction of the arrows; and, FIG 12 is a sectional view of the front jaw keeper structure illustrated in FIG. 1, taken along the line 12—12 thereof, and looking in the direction of the arrows.

Referring now to the drawings and in particluar to FIGS. 1 through 4, wherein is shown an illustrative embodiment of the invention, the numeral 10 generally designates a base member on which is mounted a base plate 11. The base member 10 and the base plate 11 coact to form a two-piece vise base. The base member 10 may be made from any suitable material, as for example, from a cast iron. The base plate 11 is also made from any suitable material, as for example, from a hardened steel material.

As best seen in FIGS. 1 and 11, the base member 10 includes the spaced apart, longitudinally extended, side walls 12 and 13 which are provided with the outwardly extended, integral, horizontal flanges 14 and 15, respectively. The flanges 14 and 15 are provided with the usual T-slots 16 and 17, respectively, for mounting the vise on a machine table or the like. The base member 10 further includes the front end wall 18 which is integrally formed with the side walls 12 and 13. The front end wall 18 is provided with the outwardly extended, integral, horizontal flange 19 which is provided with the usual T-slot 20 for mounting the vise in place. The numeral 21 designates the base member rear end wall which is integrally formed with the side walls 12 and 13 and which is provided with the outwardly extended, integral, horizontal flange 22. The flange 22 is provided with the usual T-slot 23 for mounting the vise in place.

As shown in FIGS. 1, 2 and 4, the base plate 11 is secured to the top side of the side walls 12 and 13 and the end walls 18 and 21 by means of a plurality of suitable socket head cap screws indicated by the numeral 24. The base plate 11 is further secured to the base member 10 by means of the transversely disposed key 25 which is seated in the slots 26 and 27 formed in the lower side of the plate 11 and the upper side of the base member front end wall 18, respectively. The base plate 11 is located on the base member 10 by means of the two dowel pins 28 and 29, shown in FIG. 1.

As shown in FIGS. 1 and 2, the base plate 11 is provided on opposite sides thereof with the vertically disposed, longitudinally extended pawl teeth 30 and 31. The pawl teeth 30 and 31 are spaced apart one-tenth or one hundred-thousandth of an inch.

The front end block of the vise is indicated by the numeral 32 in FIGS. 1, 2 and 4. The front end block 32 may be made from any suitable material, as for example, from cast iron. The front end block 32 is fixedly secured to the front end of the vise, on the top side of the base plate 11, by means of a plurality of suitable socket head screws 33. As illustrated in FIG. 4, each of the screws 33 is adapted to pass upwardly through suitable holes in the base member end wall 18 and the base plate 11, and into threadable engagement in a threaded hole on the underside of the front end block 32.

As best seen in FIGS. 2 and 4, the inner side of the front end block 32 is inclined or sloped inwardly and downwardly, as indicated by the numeral 34, to provide a tapered or angled front face on which is slidably mounted a front vise jaw, generally indicated by the numeral 36. The front end block 32 has an over-hanging retainer lip 35 on the upper end of the sloping front face 34. The rear face 37 of the front jaw 36 has a downwardly and outwardly inclined or sloping surface which is adapted to be slidably mounted on the complementary inclined front end block face 34. The front surface or work-engaging surface 38 of the front jaw 36 is vertically formed so as to be perpendicular to the base plate 11 at all times. The lower surface of the front jaw 36 is horizontally formed and is indicated by the numeral 39. As illustrated in FIG. 4, the front jaw 36 is provided with a plurality of stop buttons 40 on the horizontal lower end surface 39 for engagement with the top surface of the base plate 11, as more fully described hereinafter.

The front jaw 36 is provided with a flange 41 along the upper sloping rear face which is adapted to abut the lower side of the over-hanging front end block retainer lip 35. As shown in FIGS. 2 and 4, the front vertical work-engaging surface 38 of the front jaw 36 terminates at its upper end in the rearwardly and upwardly inclined top face 42 which terminates at the front end of the flange 41.

A transversely extending dirt cover is mounted on the inner upper edge of the front end block 32 and is generally indicated by the numeral 43. The cover 43 has a rear horizontal portion which is adapted to be seated in the transversely extended recess 44 formed along the upper inner edge of the front end block 32. The front portion of the cover 43 is curved downwardly and backwardly so as to overlay the front end block retainer lip 35 and the flange 41 of the front jaw 36. The cover 43 is releasably secured in place by any suitable means, as for example, by a plurality of flat-head screws 45. The cover 43 functions as a dirt cover to prevent dirt and chips from getting between the inclined surfaces on the front end of the front end block 32 and the rear end of the front jaw 36.

As shown in FIGS. 1 and 2, the front jaw 36 is retained in place on the front end block inclined surface 34 by means of a pair of spring loaded keepers, generally indicated by the numerals 46 and 47. The jaw keepers 46 and 47 are similarly constructed, and accordingly, only jaw keeper 46 will be described in detail. Although the jaw keepers 46 and 47 are similarly constructed, they are not interchangeable because the jaw keeper 46 is a right hand jaw keeper and the jaw keeper 47 is a left hand jaw keeper.

As shown in FIGS. 2 and 12, the jaw keeper 46 is substantially L-shaped in cross section and comprises the arm 48 and the integral inwardly extending jaw retaining and guiding leg 49. The jaw keeper arm portion 48 is formed from a metal plate having parallel upper and lower edges, and a rounded rear end which is adapted to be seated in the recess 50 formed on the outer side of the front end block 32. The jaw keeper arm 48 is fixedly secured in the recess 50 by any suitable means, as by the flat-headed screw 51. The inwardly extended jaw keeper leg 49 is substantially square in cross section and is slidably mounted in a recess formed on the outer side of the front jaw 36 and bounded by the wall surfaces 52, 53 and 54. The last-mentioned recess is formed parallel with the inclined rear surface 37 of the jaw 36. It will be seen that the recess surface 54 is formed by the flange 55 which is the outer vertical edge of the rear side of the jaw 36. The last-mentioned recess is provided with an upper end surface indicated by the numeral 56 in FIG. 9. The recess is open to the atmosphere on the outer side thereof.

As shown in FIG. 9, the jaw keeper leg 49 is provided with a bore on the upper side thereof which extends downwardly, and which is indicated by the numeral 57. Mounted in the lower end of the bore 57 is a coil spring 58 and in the upper end of the bore 57 is a cylindrical rod 59. It will be seen that the coil spring 58 functions to move the rod 59 upwardly into abutting engagement with the recess upper end surface 56, and the rod 59 in turn moves the jaw 36 upwardly so as to move the flange 41 into abutting engagement with the front end block retainer lip 35 and maintained the jaw 36 in an upwardly disposed inoperative position. As more fully explained hereinafter, during a work engaging operation the jaw 36 is adapted to travel downwardly on the inclined surface 34 on the front end block for a predetermined selected travel distance of approximately .03″ until the stop button 40 engages the upper surface of the base plate 11. The rear face of the jaw keeper leg 49 which engages the jaw surface 54 provides a guiding surface on which the jaw 36 is guided in its upward and downward movements.

The vise of the present invention includes a slide means comprising a front slide and a rear slide, generally indicated by the numerals 60 and 61, respectively. As illustrated in FIGS. 1 through 4, the slides 60 and 61 are slidably mounted on the top side of the base plate 11. The slides 61 and 60 are slidable to the fully opened position on the right end of the base plate, as viewed in FIG. 1. When the slides 60 and 61 are in the fully opened position, the rear end of the slide 61 abuts the stop member 62 which is fixed to the right end of the base plate 11 by any suitable means, as by the flat-headed screw 63.

The front slide 60 comprises the block 64 which is preferably a casting made from any suitable material, as cast iron. As indicated in FIG. 2, the front slide block 64 is provided on the bottom thereof with a longitudinally extended slot 65 in which is slidably received the base plate 11. The slot 65 is bounded by the slot wall surfaces 66 and 67, as shown in FIG. 1. The front slide 60 is held down on the vise base plate 11 by means of the gibs 68 and 69 which are secured to the slide block 64 by any suitable means, as by a plurality of flat-headed screws indicated by the numerals 70.

The front end of the front slide 60 is constructed identically to the front end of the front end block 32 so as to hold the rear vise jaw, generally indicated by the numeral 71, for operation with the identical front vise jaw 36. As shown in FIGS. 2 and 4, the front side of the front slide block 64 is inclined or sloped inwardly and downwardly as indicated by the numeral 72, to provide a tapered or angled front face on which is slidably mounted the front vise jaw 71. The front end of the slide block 64 has an over-hanging retainer lip 73 on the upper end of the sloping front face 72. The rear face 74 of the rear vise jaw 71 has a downwardly and outwardly inclined or sloping surface which is adapted to be slidably mounted on the complementary inclined front face of the slide block 64. The front surface or work-engaging surface 75 of the rear vise jaw 71 is vertically formed so as to be perpendicular to the base plate 11 at all times. The lower surface of the rear jaw 71 is horizontally formed and is indicated by the numeral 76. As illustrated in FIG. 4, the rear vise jaw 71 is provided with a plurality of stop buttons 77 on the horizontal lower end surface 76 for engagement with the top surface of the base plate 11, as more fully described hereinafter.

The vise rear jaw 71 is provided with a flange 78, along the upper sloping rear face, which is adapted to abut the lower side of the over-hanging front end retainer lip 73 on the block 64. As shown in FIGS. 2 and 4, the front vertical work-engaging surface 75 of the rear jaw 71 terminates at its upper end in the rearwardly and upwardly inclined top face 79 which terminates at the front end of the flange 78.

A transversely extending dirt cover is mounted on the upper end of the slide block 64 at the front edge thereof, and it is generally indicated by the numeral 80. The cover 80 has a rear horizontal portion which is adapted to be seated in the transversely extended recess 81 formed along the upper inner edge of the slide block 64. The front portion of the cover 80 is curved downwardly and backwardly so as to overlay the slide block retainer lip 73 and the flange 78 of the rear jaw 71. The cover 80 is releasably secured in place by any suitable means, as for example, by a plurality of flat-headed screws 82. The cover 80 functions as a dirt cover to prevent dirt from getting between the inclined surfaces on the front end of the slide block 64 and the rear end of the rear jaw 71.

As shown in FIGS. 1 and 2, the rear jaw 71 is retained in place on the front end of the slide block 64, on the inclined surface 72 thereof, by means of a pair of spring loaded keepers, generally indicated by the numerals 83 and 84. The jaw keepers 83 and 84 are similarly constructed, but they are not interchangeable because the jaw keeper 83 is a left hand jaw keeper and the jaw keeper 84 is a right hand jaw keeper. The jaw keepers 83 and 84 are constructed similarly to the jaw keepers 46 and 47, as previously described for retaining the front jaw 36 in place, and accordingly, the identical parts have been marked with similar reference numerals.

The rear slide 61 comprises the block 85 which is preferably a casting made from any suitable material, as cast iron. As indicated in FIGS. 1 and 3, the rear slide block 85 is provided on the bottom thereof with a longitudinally extended slot 86 which is bounded by the slot wall surfaces 87 and 88 for the slidable reception of the base plate 11. The rear slide 61 is held on the vise plate 11 by means of the gibs 89 and 90 which are secured to the rear slide block 85 by any suitable means, as by a plurality of flat-headed screws indicated by the numerals 91.

As shown in FIGS. 1 and 2, the slide block 60 is normally retained against the front face of the rear slide block 61 by means of a pair of coil springs, generally indicated by the numerals 92 and 93. The springs 92 and 93 are disposed longitudinally of the base plate 11 and have the front ends thereof secured to the dowl pins 97 and 96 which are vertically disposed in the longitudinal recesses 95 and 94, respectively, formed on the upper side of the front slide block 64. The other end of the springs 92 and 93 are fixedly secured to the dowl pins 100 and 101 which are vertically disposed and fixed in the recesses 98 and 99, respectively, formed in the upper side of the rear slide block 85. It will be seen that the springs 92 and 93 connect the slides 60 and 61 together so that the slides move as a unit.

The rear slide 61 is adapted to be releasably locked to the pawl teeth 30 and 31, formed on the base plate 11, by means of a pair of spring biased pawls 102 and 103, as shown in FIGS. 1 and 5. As best seen in FIGS. 5 and 11, the pawls 102 and 103 are horizontally disposed in a pair of recesses 104 and 105 formed on opposite sides of the slide block 85 and on a plane parallel with the base plate 11. The pawls 102 and 103 are swingably mounted on the vertically disposed round-head socket screws 106 and 107, respectively, which also function to retain the gibs 89 and 90 on the rear slide block 85.

As shown in FIG. 5, the pawls 102 and 103 are each provided with at least three teeth as 109 and 110, respectively, which are adapted to be biased into locking engagement with the pawl teeth 30 and 31 by means of the coil springs 111 and 112. It will be seen that when the pawls 102 and 103 are in the position shown in FIGS. 5 and 7, that the rear slide 61 is locked in place on the base plate 11. As best seen in FIG. 11, the pawls 102 and 103 are provided with an upwardly extended arm as 113 and an upwardly extended arm 114, respectively, which are disposed in a pair of vertical bores 115 and 116 in the rear slide block 85. As best seen in FIGS. 5 and 11, the pawls 102 and 103 are adapted to be swung about the screws 106 and 107 by means of a pair of pawl actuating push rods 117 and 118, respectively, which are slidably mounted in the outwardly and downwardly sloping bores 119 and 120 formed in the rear slide block 85. The outer lower ends of the rods 117 and 118 are adapted to abut against the arms 113 and 114 and the upper or inner ends of the rods 117 and 118 project into a substantially semi-circular recess 121 formed in the upper surface of the rear slide block 85. The inner ends of the pawl push rods 117 and 118 are adapted to be operatively engaged by a rotatable cam member, generally indicated by the numeral 122, as shown in FIGS. 1 and 5.

As best seen in FIGS. 1 and 5, the cam member 122 is provided with an integral rearwardly and outwardly extended handle 123. The handle 123 is adapted to be moved in a horizontal arc from side to side in the rectangular recess 124 formed in the rear end of the rear slide block 85 and which communicates at the forward end thereof with the recess 121. The cam member 122 is provided with a central bore 125 in which is operatively mounted a sleeve bearing 126. The sleeve bearing 126 is mounted on the vertically disposed pin 127. As shown in FIG. 11, the lower end of the pin 127 is fixedly mounted in the bore 128 in the slide block 85. The upper end of the recess 121 is enclosed by the horizontally disposed plate 129 which is fixedly secured to the top of the slide block 85 by any suitable means, as by means of a plurality of round-head socket screws 130. The upper end of the cam member mounting pin 127 is adapted to be operatively mounted in the bore 131 formed in the plate 129.

As shown in FIG. 5, the cam member 122 is provided with a pair of diametrically oppositely disposed arcuate cam faces 132 and 133 which are adapted to engage the inner ends of the push rods 117 and 118 when the cam member is in the position shown in FIG. 5. The cam member 122 has a second pair of diametrically oppositely disposed cam surfaces 134 and 135 which are adapted to engage the inner ends of the push rods 117 and 118 and move the push rods outwardly to the positions shown in FIG. 6 to release the pawls 102 and 103 from locking engagement with the pawl teeth 30 and 31 and permit the slides 60 and 61 to be moved lengthwise of the base plate 11. In order to engage the cam surfaces 134 and 135 with the push rods 117 and 118 to release the pawls, the handle 123 is moved counterclockwise as viewed in FIG. 1, to the dotted line position indicated by the numeral 136 or to the solid line position as shown in FIG. 6.

It will be understood that the bearing member 126 may be of any suitable type as, for example, a roller or ball bearing member so as to provide substantially no friction when the handle 123 is moved. The handle 123 is provided with a friction brake which comprises a plastic friction button 137 which may be made from any suitable material as, for example, a phenolic plastic, and which is mounted in the circular recess 138 formed on the upper side of the handle 123. As shown in FIGS. 4 and 5, the friction button 137 is adapted to engage the lower surface of the rear slide plate 129. The handle brake friction means further includes a conventional wave washer 139 which is disposed in the circular recess 140 in the lower side of the handle 123 which engages the slide block 85 on the lower surface of the handle V-slot 124. The aforedescribed friction brake means permits the handle to be moved to any given position and to remain in such position regardless of any back pressure put on the rear slide 61 due to vibration of any type which may ordinarily tend to unlock the handle 123 and make it creep out of position.

The front slide 60 is adapted to be moved forwardly away from the rear slide 61 for gripping a workpiece between the front jaw 36 and the rear jaw 71 by the following described structure. As best seen in FIGS. 1 and 5, the front slide block 64 is provided on the upper side thereof and adjacent the rear end and in a central location, with a recess 141. Rotatably mounted in the recess 141 is a roller member 142 which is rotatably mounted on the vertical pin 143. The roller 142 may be suitably journalled on the pin 143 by any suitable bearing means as, for example, a roller bearing, a ball bearing or a sleeve bearing means. Preferably, a ball or roller bearing means is desired. As shown in FIG. 4, the lower end of the pin 143 is fixed in the bore 144 formed in the slide block 64. The upper end of the pin 143 is mounted in the bore 145 in the cover plate 146. The cover plate 146 is mounted on the upper side of the front slide plate 64 and is fixedly secured in place by any suitable means, as by a plurality of flat-headed screws 147.

The roller member 142 is adapted to be biased into rolling engagement with the cam member 122 by means of the springs 92 and 93. The cam member 122 functions to cam the front slide 60 away from the rear slide 61 to bring the rear jaw 71 into operative engagement with a workpiece and clamp the same between the front jaw 36 and the rear jaw 71 without moving the rear slide 61. In use, the vise of the present invention would be operatively mounted on a machine table or the like. The slide members 60 and 61 may be moved to a desired position on the base plate 11 without the use of any special indicating devices. This action may be accomplished because the pawl teeth 30 and 31 are exactly $\frac{1}{10}''$ or .100" apart. The cam member 122 is adapted to move the front slide 60 forwardly away from the rear slide 61 a distance of .140". Accordingly, if the width of the workpiece is known, the rear slide 61 may be moved a proportionate distance away from the front vise jaw 36, so as to bring the front surface of the rear jaw 71 away from the front jaw 36 a distance equal to a number of pawl teeth which total up to the sum of the width of the workpiece plus at least one additional pawl tooth. The workpiece is then mounted in place between the jaws 36 and 71 and with the handle 123 in the solid line position shown in FIG. 1, the vise is ready for clamping the workpiece in place.

A workpiece may be quickly and easily clamped in place on the top of the base plate 11 by moving the handle 123 clockwise to the dotted line position shown by the numeral 152 in FIG. 1. When the handle 123 is moved to the position marked by the numeral 152, the roller 142 will be engaged by the cam surface 150 on the cam member 122 and the front slide 61 will be moved to the left as viewed in FIG. 1 into operative engagement with the workpiece. The workpiece will be engaged by the vertical surfaces 38 and 75 on the front and rear jaws 36 and 71, respectively, and brought downwardly into a proper level position on the base plate 11 by means of the jaws being cammed downwardly on the inclined surfaces 34 and 72 on the front block 32 and the slide block 64, respectively. The workpiece may be released by moving the handle counterclockwise as viewed in FIG. 1, back to the position marked 123. The springs 92 and 93 then function to return the slide block 60 back to the position shown in FIG. 1, and the springs 57 in the jaw keepers actuate the jaws 36 and 71 upwardly to the inoperative position shown in FIG. 4. The vise is then ready for the insertion of a second similar workpiece without the need for resetting any of the slides on the vise. It will be seen that the plurality of workpieces may be successively mounted in the vise after the rear slide 60 is once clamped into position on the base plate 11 and without changing any setting of any type on the vise.

The cam member 122 provides the aforedescribed pawl releasing and clamping action and front slide actuating action because of the novel construction of the cam member. It will be understood that the cam member 122 may be made to any desired size to provide the aforedescribed functions. For example, if the radial distance from the center of the cam member pivot pin is represented by the small letter "$r$" for the cam surfaces 132 and 133, the radial distances for the pawl releasing cam 134 and 135 would be "$r$" plus $\frac{1}{16}$ of an inch. As viewed in FIG. 1, the radial distance between the center point of the pivot pin 127 to the end point 148 of the cam surface 132 would also be equal to "$r$." The initial point 149 of the front slide operating cam surface 150 would be equal to "$r$" plus .100". The cam actuating surface 150 would then increase radialy outwardly from the center point of the pin 127 in a counter-clockwise direction as viewed in FIG. 1, to the termination point 151 which would be spaced apart from the center point of the pin 127 by a distance equal to "$r$" plus .240".

As shown in FIGS. 2 and 4, a substantially U-shaped strap or cover, generally indicated by the numeral 153, is mounted around the rear side of the front slide 60 so as to enclose the front end of the rear slide 61. The cover 153 is seated in a recess 154 which extends over the rear upper side of the slide 60 and along the rear sides thereof. The cover 153 is secured in place by any suitable means, as by a plurality of screws 156. The cover 153 extends rearwardly beyond the rear end 155 of the front slide 60 and overlaps the front end of the rear slide 61. As viewed in FIG. 2, the numeral 151 indicated the front edge of the cover 153 and the numeral 158 indicates the rear edge of the cover 153. The cover 153 functions to prevent dirt and chips from getting in between the front and rear slides 60 and 61, respectively.

It will be seen from the aforedescribed operation of the vise that the single handle 123 is employed for unlocking the slides to move them into a new position and to lock them into the new position and to then lock and unlock a workpiece in position between the vise jaws 36 and 71. The mounting of the handle 123 on a bearing structure and the fact that the cam member 122 engages the roller member 142 on the front slide provides a slide locking means which is practically frictionless, whereby the operator has only to expend effort to produce locking pressure only. None of the operator's effort is lost in friction and moving the parts of the slide means relative to each other. The front slide 60 is automatically returned by the springs 92 and 93 to the starting position without the rear slide 61 changing position, so that it is possible to mount succeeding workpieces in the vise without resetting the vise. Experience has shown that the vise of the present invention is quick acting and efficient in operation and increases production because of the minimum time and effort required for mounting a workpiece in the vise. The workpiece leveling action of the incline mounted jaws 36 and 71 also produces high precision workpieces.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What we claim is:

1. A precision vise for clamping a workpiece in a level position comprising: a stationary base; a front end block fixed on one end of said base; a first jaw on said front end block; a rear slide movably mounted on said base; means for locking said rear slide in selected adjusted positions on said base; a front slide movably mounted on said base between said first jaw and said rear slide; a second jaw on said front slide; means connecting said front slide to said rear slide and to allow the front slide to be moved relative to said rear slide when said rear slide is locked on said base for clamping a workpiece between said jaws in a level position; and, cam means pivotally mounted on said rear slide and movable to a first position to operate said locking means to unlock the same to permit the slides to be moved on the base to another position, and movable to a second position to release said locking means to permit it to lock the rear slide on the base, and movable to a third position with the rear slide locked on the base so as to cam the front slide away from the rear slide for clamping a workpiece between said jaws.

2. A precision vise for clamping a workpiece in a level position comprising: a stationary base; a front end block fixed on one end of said base; a first jaw on said front end block; a rear slide movably mounted on said base; means for locking said rear slide in selected adjusted positions on said base; a front slide movably mounted on said base between said first jaw and said rear slide; a second jaw on said front slide; spring means connecting said front slide to said rear slide and normally biasing said front slide against said rear slide and operative to allow the front slide to be moved relative to said rear slide when said rear slide is locked on said base for clamping a workpiece between said jaws in a level position; and, cam means pivotally mounted on said rear slide and movable to a first position to operate said locking means to unlock the same to permit the slides to be moved on the base to another position, and movable to a second position to release said locking means to permit it to lock the rear slide on the base, and movable to a third position with the rear slide locked on the base so as to cam the front slide away from the rear slide for clamping a workpiece between said jaws.

3. A precision vise for clamping a workpiece in a level position comprising: a stationary base; a front end block fixed on one end of said base; a first jaw on said front end block; a rear slide movably mounted on said base; spring biased pawl means carried on said rear slide for locking said rear slide to said base in selected adjusted positions on said base; a front slide movably mounted on said base between said first jaw and said rear slide; a second jaw on said front slide; means connecting said front slide to said rear slide and to allow the front slide to be moved relative to said rear slide when said rear slide is locked on said base for clamping a workpiece between said jaws in a level position; and, cam means pivotally mounted on said rear slide and movable to a first position to operate said spring biased pawl means to unlock the same to permit the slides to be moved on the base to another position, and movable to a second position to release said spring biased pawl means to permit it to lock the rear slide on the base, and movable to a third position with the rear slide locked on the base so as to cam the front slide away from the rear slide for clamping a workpiece between said jaws.

4. A precision vise for clamping a workpiece in a level position comprising: a stationary base; a front end block fixed on one end of said base; a first jaw on said front end block; a rear slide movably mounted on said base; means for locking said rear slide in selected adjusted positions on said base; a front slide movably mounted on said base between said first jaw and said rear slide; a second jaw on said front slide; means connecting said front slide to said rear slide and to allow the front slide to be moved relative to said rear slide when said rear slide is locked on said base for clamping a workpiece between said jaws in a level position; and, a cam member pivotally mounted on said rear slide and engageable with said locking means and front slide, and movable to a first position to operate said locking means to unlock the same to permit the slides to be moved on the base to another position, and movable to a second position to release said locking means to permit it to lock the rear slide on the base, and movable to a third position with the rear slide locked on the base so as to cam the front slide away from the rear slide for clamping a workpiece between said jaws.

5. A precision vise for clamping a workpiece in a level position comprising: a stationary base; a front end block fixed on one end of said base; a first jaw on said front end block; a rear slide movably mounted on said base; spring biased pawl means carried on said rear slide for locking said rear slide in selected adjusted positions on said base; a front slide movably mounted on said base between said first jaw and said rear slide; a second jaw on said front slide; spring means connecting said front slide to said rear slide and normally biasing said front slide against said rear slide and operative to allow the front slide to be moved relative to said rear slide when said rear slide is locked on said base for clamping a workpiece between said jaws in a level position; and, cam means pivotally mounted on said rear slide and movable to a first position to operate said spring biased pawl means to unlock the same to permit the slides to be moved on the base to another position, and movable to a second position to release said spring biased pawl means to permit it to lock the rear slide on the base, and movable to a third position with the rear slide locked on the base so as to cam the front slide away from the rear slide for clamping a workpiece between said jaws.

6. A precision vise for clamping a workpiece in a level position comprising: a stationary base; a front end block fixed on one end of said base; a first jaw on said front end block; a rear slide movably mounted on said base; spring biased pawl means carried on said rear slide for locking said rear slide in selected adjusted positions on said base; a front slide movably mounted on said base between said first jaw and said rear slide; a second jaw on said front slide; spring means connecting said front slide to said rear slide and normally biasing said front slide against said rear slide and operative to allow the front slide to be moved relative to said rear slide when said rear slide is locked on said base for clamping a workpiece between said jaws in a level position; and, a cam member pivotally mounted on said rear slide and engageable with said spring biased pawl means and front slide, and movable to a first position to operate said spring biased pawl means to unlock the same to permit the slides to be moved on the base to another position, and movable to a second position to release said spring biased pawl means to permit it to lock the rear slide on the base, and movable to a third position with the rear slide locked on the base so as to cam the front slide away from the rear slide for clamping a workpiece between said jaws.

7. A precision vise for clamping a workpiece in a level position comprising: a stationary base; a front end block fixed on one end of said base; a first jaw on said front end block; a rear slide movably mounted on said base; means for locking said rear slide in selected adjusted positions on said base; a front slide movably mounted on said base between said first jaw and said rear slide; a second jaw on said front slide; spring means connecting said front slide to said rear slide and normally biasing said front slide against said rear slide and operative to allow the front slide to be moved relative to said rear slide when said rear slide is locked on said base for clamping a workpiece between said jaws in a level position; and, a cam member pivotally mounted on said rear slide and engageable with said locking means and front slide, and movable to a first position to operate said locking means to unlock the same to permit the slides to be moved on the base to another position, and movable to a second position to release said locking means to permit it to lock the rear slide on the base, and movable to a third position with the rear slide locked on the base so as to cam the front slide away from the rear slide for clamping a workpiece between said jaws.

8. A precision vise for clamping a workpiece in a level position comprising: a stationary base; a front end block fixed on one end of said base; a first jaw on said front end block; a rear slide movably mounted on said base; spring biased pawl means carried on said rear slide for locking said rear slide to said base in selected adjusted positions on said base; a front slide movably mounted on said base between said first jaw and said rear slide; a second jaw on said front slide; means connecting said front slide to said rear slide and to allow the front slide to be moved relative to said rear slide when said rear slide is locked on said base for clamping a workpiece between said jaws in a level position; and, a cam member pivotally mounted on said rear slide and engageable with said spring biased pawl means and front slide, and movable to a first position to operate said spring biased pawl means to unlock the same to permit the slides to be moved on the base to another position, and movable to a second position to release said spring biased pawl means to permit it to lock the rear slide on the base, and movable to a third position with the rear slide locked on the base so as to cam the front slide away from the rear slide for clamping a workpiece between said jaws.

9. A precision vise for clamping a workpiece in a level position comprising: a stationary base; a front end block fixed on one end of said base; a first jaw on said front end block; a rear slide movably mounted on said base; means for locking said rear slide in selected adjusted positions on said base; a front slide movably mounted on said base between said first jaw and said rear slide; a second jar on said front slide; means connecting said front slide to said rear slide and to allow the front slide to be moved relative to said rear slide when said rear slide is locked on said base for clamping a workpiece between said jaws in a level position; cam means pivotally mounted on said rear slide and movable to a first position to operate said locking means to unlock the same to permit the slides to be moved on the base to another position, and movable to a second position to release said locking means to permit it to lock the rear slide on the base, and movable to a third position with the rear slide locked on the base so as to cam the front slide away from the rear slide for clamping a workpiece between said jaws; each of said jaws having a vertical workpiece engaging surface on its front side which is perpendicular to the base and an inclined surface on its rear side which extends downwardly and outwardly from the top end of the jaws; said front end block and front slide each having an inclined surface formed on its front side and mating with the inclined surfaces of the first and second jaws, respectively; and, means retaining said jaws on the front end block and front slide and yieldably biasing the jaws to a raised inoperative position above the base, whereby when the rear slide is moved to a workpiece clamping position the jaws will be moved downwardly into engagement with said base with the workpiece clamped therebetween in a level position on the base.

10. A precision vise for clamping a workpiece in a level position comprising: a stationary base; a front end block fixed on one end of said base; a first jaw on said front end block; a rear slide movably mounted on said base; means for locking said rear slide in selected adjusted positions on said base; a front slide movably mounted on said base between said first jaw and said rear slide; a second jaw on said front slide; spring means connecting said front slide to said rear slide and normally biasing said front slide against said rear slide and operative to allow the front slide to be moved relative to said rear slide when said rear slide is locked on said base for clamping a workpiece between said jaws in a level position; cam means pivotally mounted on said rear slide and movable to a first position to operate said locking means to unlock the same to permit the slides to be moved on the base to another position, and movable to a second position to release said locking means to permit it to lock the rear slide on the base, and movable to a third position with the rear slide locked on the base so as to cam the front slide away from the rear slide for clamping a workpiece between said jaws; each of said jaws having a vertical workpiece engaging surface on its front side which is perpendicular to the base and an inclined surface on its rear side which extends downwardly and outwardly from the top end of the jaws; said front end block and front slide each having an inclined surface formed on its front side and mating with the inclined surfaces of the first and second jaws, respectively; and, means retaining said jaws on the front end block and front slide and yieldably biasing the jaws to a raised inoperative position above the base, whereby when the rear slide is moved to a workpiece clamping position the jaws will be moved downwardly into engagement with said base with the workpiece clamped therebetween in a level position on the base.

11. A precision vise for clamping a workpiece in a level position comprising: a stationary base; a front end block fixed on one end of said base; a first jaw on said front end block; a rear slide movably mounted on said base; spring biased pawl means carried on said rear slide for locking said rear slide to said base in selected adjusted positions on said base; a front slide movably mounted on said base between said first jaw and said rear slide; a second jaw on said front slide; means connecting said front slide to said rear slide and to allow the front slide to be moved relative to said rear slide when said rear slide is locked on said base for clamping a workpiece between said jaws in a level position; cam means pivotally mounted on said rear slide and movable to a first position to operate said spring biased pawl means to unlock the same to permit the slides to be moved on the base to another position, and movable to a second position to release said spring biased pawl means to permit it to lock the rear slide on the base, and movable to a third position with the rear slide locked on the base so as to cam the front slide away from the rear slide for clamping a workpiece between said jaws; each of said jaws having a vertical workpiece engaging surface on its front side which is perpendicular to the base and an inclined surface on its rear side which extends downwardly and outwardly from the top end of the jaws; said front end block and front slide each having an inclined surface formed on its front side and mating with the inclined surfaces of the first and second jaws, respectively; and, means retaining said jaws on the front end block and front slide and yieldably biasing the jaws to a raised inoperative position above the base, whereby when the rear slide is moved to a workpiece clamping position the jaws will be moved downwardly into engagement with said base with the workpiece clamped therebetween in a level position on the base.

12. A precision vise for clamping a workpiece in a level position comprising: a stationary base; a front end block fixed on one end of said base; a first jaw on said front end block; a rear slide movably mounted on said base; means for locking said rear slide in selected adjusted positions on said base; a front slide movably mounted on said base between said first jaw and said rear slide; a second jaw on said front slide; means connecting said front slide to said rear slide and to allow the front slide to be moved relative to said rear slide when said rear slide is locked on said base for clamping a workpiece between said jaws in a level position; a cam member pivotally mounted on said rear slide and engageable with said locking means and front slide, and movable to a first position to operate said locking means to unlock the same to permit the slides to be moved on the base to another position, and movable to a second position to release said locking means to permit it to lock the rear slide on the base, and movable to a third position with the rear slide locked on the base so as to cam the front slide away from the rear slide for clamping a workpiece between said jaws; each of said jaws having a vertical workpiece engaging surface on its front side which is perpendicular to the base and an inclined surface on its rear side which extends downwardly and outwardly from the top end of the jaws; said front end block and front slide each having an inclined surface formed on its front side and mating with the inclined surfaces of the first and second jaws, respectively; and, means retaining said jaws on the front end block and front slide and yieldably biasing the jaws to a raised inoperative position above the base, whereby when the rear slide is moved to a workpiece clamping position the jaws will be moved downwardly into engagement with said base with the workpiece clamped therebetween in a level position on the base.

13. A precision vise for clamping a workpiece in a level position comprising: a stationary base; a front end block fixed on one end of said base; a first jaw on said front end block; a rear slide movably mounted on said base; spring biased pawl means carried on said rear slide for locking said rear slide to said base in selected adjusted positions on said base; a front slide movably mounted on said base between said first jaw and said rear slide; a second jaw on said front slide; spring means connecting said front slide to said rear slide and normally biasing said front slide against said rear slide and operative to allow the front slide to be moved relative to said rear slide when said rear slide is locked on said base for clamping a workpiece between said jaws in a level position; cam means pivotally mounted on said rear slide and movable to a first position to operate said spring biased pawl means to unlock the same to permit the slides to be moved on the base to another position, and movable to a second position to release said spring biased pawl means to permit it to lock the rear slide on the base, and movable to a third position with the rear slide locked on the base so as to cam the front slide away from the rear slide for clamping a workpiece between said jaws; each of said jaws having a vertical workpiece engaging surface on its front side which is perpendicular to the base and an inclined surface on its rear side which extends downwardly and outwardly from the top end of the jaws; said front end block and front slide each having an inclined surface formed on its front side and mating with the inclined surfaces of the first and second jaws, respectively; and, means retaining said jaws on the front end block and front slide and yieldably biasing the jaws to a raised inoperative position above the base, whereby when the rear slide is moved to a workpiece clamping position the jaws will be moved downwardly into engagement with said base with the workpiece clamped therebetween in a level position on the base.

14. A precision vise for clamping a workpiece in a level position comprising: a stationary base; a front end block fixed on one end of said base; a first jaw on said front end block; a rear slide movably mounted on said base; spring biased pawl means carried on said rear slide for locking said rear slide to said base in selected adjusted positions on said base; a front slide movably mounted on said base between said first jaw and said rear slide; a second jaw on said front slide; spring means connecting said front slide to said rear slide and normally biasing said front slide against said rear slide and operative to allow the front slide to be moved relative to said rear slide when said rear slide is locked on said base for clamping a workpiece between said jaws in a level position; a cam member pivotally mounted on said rear slide and engageable with said spring biased pawl means and front slide, and movable to a first position to operate said spring biased pawl means to unlock the same to permit the slides to be moved on the base to another position, and movable to a second position to release said spring biased pawl means to permit it to lock the rear slide on the base, and movable to a third position with the rear slide locked on the base so as to cam the front slide away from the rear slide for clamping a workpiece between said jaws; each of said jaws having a vertical workpiece engaging surface on its front side which is perpendicular to the base and an inclined surface on its rear side which extends downwardly and outwardly from the top end of the jaws; said front end block and front slide each having an inclined surface formed on its front side and mating with the inclined surfaces of the first and second jaws, respectively; and, means retaining said jaws on the front end block and front slide and yieldably biasing the jaws to a raised inoperative position above the base, whereby when the rear slide is moved to a workpiece clamping position the jaws will be moved downwardly into engagement with said base with the workpiece clamped therebetween in a level position on the base.

15. A precision vise for clamping a workpiece in a level position comprising: a stationary base; a front end block fixed on one end of said base; a first jaw on said front end block; a rear slide movably mounted on said base; spring biased pawl means carried on said rear slide for locking said rear slide to said base in selected adjusted positions on said base; a front slide movably mounted on said base between said first jaw and said rear slide; a second jaw on said front slide; means connecting said front slide to said rear slide and to allow the front slide to be moved relative to said rear slide when said rear slide is locked on said base for clamping a workpiece between said jaws in a level position; a cam member pivotally mounted on said rear slide and engageable with said spring biased pawl means and front slide, and movable to a first position to operate said spring biased pawl means to unlock the same to permit the slides to be moved on the base to another position, and movable to a second position to release said spring biased pawl means to permit it to lock the rear slide on the base, and movable to a third position with the rear slide locked on the base so as to cam the front slide away from the rear slide for clamping a workpiece between said jaws; each of said jaws having a vertical workpiece engaging surface on its front side which is perpendicular to the base and an inclined surface on its rear side which extends downwardly and outwardly from the top end of the jaws; said front end block and front slide each having an inclined surface formed on its front side and mating with the inclined surfaces of the first and second jaws, respectively; and, means retaining said jaws on the front end block and front slide and yieldably biasing the jaws to a raised inoperative position above the base, whereby when the rear slide is moved to a workpiece clamping position the jaws will be moved downwardly into engagement with said base with the workpiece clamped therebetween in a level position on the base.

16. A precision vice for clamping a workpiece in a level position comprising: a stationary base including a base member and a base plate mounted on said base member; a front end block fixed on one end of said base; a first jaw on said front end block; a rear slide movably mounted on said base; said base plate being provided with a plurality of longitudinally extending, uniformly spaced pawl teeth on each side thereof; a pair of spring biased pawls carried on said rear slide on opposite sides thereof for locking said rear slide to said pawl teeth on said base in selected adjusted positions on said base; a front slide movably mounted on said base between said first jaw and said rear slide; a second jaw on said front slide; spring means connecting said front slide to said rear slide and normally biasing said front slide against said rear slide and operative to allow the front slide to be moved relative to said rear slide when said rear slide is locked on said base for clamping a workpiece between said jaws in a level position; a cam member pivotally mounted on said rear slide and engageable with said spring biased pawls and front slide, and movable to a first position to operate said spring biased pawls to unlock the same to permit the slides to be moved on the base to another position, and movable to a second position to release said spring biased pawls to permit them to lock the rear slide on the base, and movable to a third position with the rear slide locked on the base so as to cam the front slide away from the rear slide for clamping a workpiece between said jaws; each of said jaws having a vertical workpiece engaging surface on its front side which is perpendicular to the base and an inclined surface on its rear side which extends downwardly and outwardly from the top end of the jaws; said front end block and front slide each having an inclined surface formed on its front side and mating with the inclined surfaces of the first and second jaws, respectively; and, means retaining said jaws on the front end block and front slide and yieldably biasing the jaws to a raised inoperative position above the base, whereby when the rear slide is moved to a workpiece clamping position the jaws will be moved downwardly into engagement with said base with the workpiece clamped therebetween in a level position on the base.

17. A precision vise as defined in claim 16, wherein: said cam member is provided with a handle for manually moving the cam member to said first, second and third positions, and said handle is provided with a friction brake means.

18. A precision vise as defined in claim 16, wherein: said rear slide carries a pair of rods engageable with said pair of pawls and with said cam member for unlocking said pawls when said cam member is moved to said first position.

19. A precision vise as defined in claim 16, wherein: said front slide is provided with a roller engageable by said cam member for moving said front slide when the cam member is moved to said third position.

20. A precision vise as defined in claim 16, wherein: said jaw retaining means includes a pair of spring biased pins seated in recesses formed in the ends of the jaws.

References Cited by the Examiner

UNITED STATES PATENTS

| 1,020,192 | 3/12 | Dade | 269—212 |
| 1,385,088 | 7/21 | Mellor | 269—138 |
| 1,457,307 | 6/23 | Kerns | 269—138 |
| 1,801,648 | 4/31 | Swanson | 269—212 XR |

ROBERT C. RIORDON, *Primary Examiner.*